UNITED STATES PATENT OFFICE

GEORGE OENSLAGER, OF AKRON, OHIO, ASSIGNOR TO THE B. F. GOODRICH COMPANY, OF NEW YORK, N. Y., A CORPORATION OF NEW YORK

METHOD OF MAKING RUBBER DERIVATIVES

No Drawing.   Application filed February 9, 1929.   Serial No. 338,883.

This invention relates to the art of preparing rubber derivatives, and particularly to methods of preparing the hydrohalogen derivatives of rubber.

It is well known that rubber, being an unsaturated hydrocarbon, is capable of reacting with various substances, which add onto the double bonds of the hydrocarbon molecule and decrease the degree of its chemical unsaturation. Natural rubber, such as the rubber obtained from the *Hevea brasiliensis* tree and known as Pará rubber or plantation rubber, has the empirical formula $C_5H_8$, and may be considered a polymer of isoprene, which has the same formula. Actually, the rubber molecule contains only one double bond for each $C_5H_8$ group instead of the two double bonds of isoprene. In the vulcanization of rubber to ebonite or hard rubber, a theory which is generally accepted is that a sulphur atom is added to each of these double bonds. Similarly, molecules of the halogens, chlorine, bromine and iodine, or of the hydrogen halides, may be added to the double bonds of rubber. For example, when rubber is saturated with hydrogen chloride the empirical formula of the material is changed from $C_5H_8$ to $C_5H_9Cl$. The product, which is termed "rubber hydrochloride," has lost the softness and resiliency of the rubber and has become very hard and tough. Since the rubber is changed from an unsaturated to a chemically saturated compound, its resistance to most of the common chemicals, especially to the strong oxidizing acids, such as nitric acid, chromic acid, etc., is very markedly increased. Furthermore, the rubber hydrochloride is practically unaffected by the petroleum hydrocarbons such as gasoline, kerosene, lubricating oils, etc., which swell and ultimately dissolve raw rubber.

Similarly, synthetic rubber reacts with hydrogen chloride, forming hydrochlorides, but the composition of such products necessarily depends on the composition of the particular variety of synthetic rubber which is employed.

Heretofore rubber hydrochloride has customarily been prepared by dissolving rubber in a suitable solvent, such as benzol, chloroform or carbon tetrachloride, and bubbling hydrogen chloride gas through the solution until the rubber is saturated. This procedure is not only unnecessarily expensive, but is very inconvenient. It requires the employment of large volumes of solvent, which must either be recovered by evaporation and condensation or be irretrievably lost. The product is hard and does not become plastic below its decomposition temperature, hence it can be formed to the desired shape only by applying the solution in successive thin layers and allowing the solvent to evaporate.

This invention comprises a novel method whereby solid rubber is converted into rubber hydrohalide substantially without alteration of its shape. The conversion is effected by immersing the rubber, previously formed to the shape which it is finally to take, in a solution of a hydrogen halide in a solvent which is capable of dissolving substantial proportions of the hydrogen halide, and of being readily absorbed by the rubber, but is incapable of dissolving rubber. Of a number of types of solvent which were tested, the esters, or salts of organic hydroxides with organic or inorganic acids, proved the most satisfactory. They dissolve large proportions of the hydrogen halides, 10 or 20% solutions being readily obtained; they are readily absorbed by rubber and therefore penetrate it rapidly without dissolving it or causing excessive swelling; and, because of their volatility, are readily eliminated from the product by simple aeration or warming to a moderate temperature. Certain other types of solvents are likewise operable. For example, acetone, being capable of dissolving the hydrogen halides and of penetrating rubber satisfactorily without dissolving it, falls within the class defined above. However, acetone has the disadvantage of being readily polymerized and condensed to high-boiling or insoluble products in the presence of acids such as the hydrogen halides.

Certain solvents possess an excellent solvent power for the hydrogen halides, and penetrate rubber very readily, but tend to dissolve certain varieties of rubber. Such, for example, is ordinary ether. Unvulcanized rubber immersed in a solution of hydrogen chloride in ether is partially dissolved, and badly swelled and distorted by the ether before it is converted into the hydrochloride. The use of such solvents will therefore usually be limited to the conversion of rubber varieties (for example, vulcanized rubber) which are substantially insoluble therein.

Other solvents, which, while possessing one or more of the necessary properties, do not meet all of the conditions described above, are in general unsatisfactory. For example, water, and the alcohols, such as ethanol and butanol, are excellent solvents for the hydrogen halides, but are not appreciably absorbed by rubber and hence the rate of penetration and reaction of the hydrogen halide solution is insufficient for commercial operation. Hydrocarbons and their simple substitution products, such as benzol, chloroform, butyl chloride, ethylene dichloride, and even carbondisulphide, are not good solvents for the hydrogen halides, and furthermore tend to dissolve rubber completely, forming a cement.

The process of the invention will be described in detail with reference to a specific embodiment, but it will be understood that numerous modifications are possible within the scope of the invention.

Hydrogen chloride gas is bubbled through ethyl acetate until a concentrated solution is formed. Clean, light colored, unvulcanized rubber, calendered to smooth sheets $\frac{1}{16}$ inch thick, is immersed in the hydrogen chloride solution at room temperature for 36 to 48 hours. The ethyl acetate solution of hydrogen chloride penetrates the rubber rapidly, the hydrogen chloride reacting with the rubber and converting it to rubber hydrochloride. The sheets are removed from the solution and placed in a current of warm air to dry. The ethyl acetate absorbed by the rubber evaporates rapidly, most of it disappearing in a day or two at room temperature. The finished sheets have a hard, tough rather horny consistency. The shape of the rubber is substantially unchanged, the sheets remaining smooth and flat. The rubber hydrochloride is translucent, having a beautiful deep amber color.

Thicker sheets are more difficult to convert completely into the hydrochloride, the layer of rubber hydrochloride formed on the surface apparently impeding the penetration of the ethyl acetate into the deeper layers of the rubber. Such thick sheets tend to retain a central layer of unconverted soft rubber, unless they are treated for very long periods of time. Obviously, this invention is not limited to the conversion of rubber in sheet form. Rubber articles or rubber covered articles of any desired shape may be subjected to the action of hydrogen halide solutions as described above, and either completely converted to the rubber hydrohalide or provided with a surface layer thereof. Rubber containing pigments, fillers, softeners, etc., especially such as are inert to the hydrogen halides, may likewise be treated by the process of this invention, the properties of the finished product being somewhat dependent on the character and proportions of such additional ingredients. The products obtained from vulcanized soft rubber are very similar to those made from unvulcanized rubber, although they generally contain somewhat smaller proportions of the halogen, a part of the double bonds having been saturated by the sulphur or other vulcanizing agent.

The other hydrogen halides, such as hydrogen bromide and hydrogen iodide, may be substituted for the hydrogen chloride, in whole or in part, but will not usually be employed because of their high cost. Hydrogen fluoride does not readily add to rubber hydrocarbon, hence the term "halide" in the appended claims is to be understood as including the chloride, bromide, and iodide, but excluding the fluoride. Other esters, such as ethyl formate, amyl acetate, etc., may be substituted for the ethyl acetate. Esters of inorganic acids, such as diethyl carbonate, ethyl nitrate, etc., are also good solvents for the hydrogen halides and penetrate rubber readily, but many of them are less readily eliminated from the products because of their lower vapor pressure at ordinary temperatures.

It is to be understood that the term "rubber", unless otherwise limited, is employed in the appended claims is a generic sense to include vulcanized or unvulcanized soft rubber, synthetic rubber, reclaimed rubber, gutta percha, balata, and like products, whether or not admixed with pigments, fillers, softeners, etc.

Inasmuch as numerous modifications of the hereinabove described process are possible without departing from the spirit and scope of this invention, it is not intended to limit this invention except as may be required by the prior art and as indicated in the appended claims.

I claim:

1. The method of converting rubber to a rubber hydrohalide which comprises treating rubber with a solution of a hydrogen halide in a solvent capable of dissolving substantial proportions of the hydrogen halide and of being readily absorbed by rubber but substantially incapable of dissolving rubber.

2. The method of converting rubber to a rubber hydrohalide which comprises treating rubber with a solution of a hydrogen halide in a volatile organic solvent capable of dissolving substantial proportions of the hydrogen halide and of being readily absorbed by rubber but substantially incapable of dissolving rubber.

3. The method of converting rubber to rubber hydrochloride which comprises treating rubber with a solution of hydrogen chloride in a volatile organic solvent capable of dissolving substantial proportions of the hydrogen chloride and of being readily absorbed by rubber but substantially incapable of dissolving rubber.

4. The method of converting rubber into rubber hydrochloride which comprises treating rubber with a solution of hydrogen chloride in a volatile organic solvent capable of dissolving substantial proportions of hydrogen chloride without chemical reaction therewith and of being readily absorbed by rubber but incapable of dissolving rubber.

5. The method of converting rubber into rubber hydrochloride which comprises treating rubber with a solution of hydrogen chloride in an ester.

6. The method of converting rubber into rubber hydrochloride which comprises treating rubber with a solution of hydrogen chloride in a readily volatile ester.

7. The method of converting rubber into rubber hydrochloride which comprises immersing rubber in a solution of hydrogen chloride in a readily volatile ester of an organic acid.

8. The method of converting rubber into rubber hydrochloride which comprises immersing rubber in a solution of hydrogen chloride in a readily volatile ethyl ester.

9. The method of converting rubber into rubber hydrochloride which comprises immersing rubber in a solution of hydrogen chloride in ethyl acetate.

10. The method of preparing rubber hydrochloride which comprises immersing thin sheets of rubber in a solution of hydrogen chloride in ethyl acetate.

11. The method of converting rubber into rubber hydrochloride which comprises treating soft rubber with a solution of hydrogen chloride in a volatile ester.

12. The method of converting rubber into rubber hydrochloride which comprises immersing soft rubber in a solution of hydrogen chloride in ethyl acetate.

13. The method of manufacturing a shaped article of a rubber hydrohalide which comprises forming rubber to the desired shape, and treating it with a solution of a hydrogen halide in a volatile organic solvent capable of dissolving substantial proportions of the hydrogen halide and of being readily absorbed by rubber but substantially incapable of dissolving rubber.

14. The method of manufacturing a shaped article of a rubber hydrohalide which comprises forming soft rubber to the desired shape, and immersing it in a solution of a hydrogen halide in a volatile ester.

15. The method of manufacturing a shaped article of rubber hydrochloride which comprises forming soft rubber to the desired shape, and immersing it in a solution of hydrogen chloride in a readily volatile ester of an organic acid.

16. The method of manufacturing a shaped article of rubber hydrochloride which comprises forming soft rubber to the desired shape, and immersing it in a solution of hydrogen chloride in ethyl acetate.

In witness whereof I have hereunto set my hand this 5th day of February, 1929.

GEORGE OENSLAGER.